United States Patent
Sturcken et al.

(10) Patent No.: US 9,847,718 B2
(45) Date of Patent: Dec. 19, 2017

(54) APPARATUS AND METHODS FOR INTEGRATED POWER CONVERTER WITH HIGH BANDWIDTH

(71) Applicant: Ferric Inc., New York, NY (US)

(72) Inventors: Noah Sturcken, New York, NY (US); David Jew, New York, NY (US); Joe Meyer, New York, NY (US)

(73) Assignee: Ferric, Inc., New York, NY (US)

( * ) Notice: Subject to any disclaimer, the term of this patent is extended or adjusted under 35 U.S.C. 154(b) by 26 days.

(21) Appl. No.: 14/814,033

(22) Filed: Jul. 30, 2015

(65) Prior Publication Data

US 2016/0036330 A1 Feb. 4, 2016

Related U.S. Application Data

(60) Provisional application No. 62/032,758, filed on Aug. 4, 2014.

(51) Int. Cl.
*H02M 3/158* (2006.01)
*H02M 1/00* (2006.01)

(52) U.S. Cl.
CPC ......... *H02M 3/158* (2013.01); *H02M 3/1584* (2013.01); *H02M 2001/0045* (2013.01)

(58) Field of Classification Search
CPC .... H02M 3/156–3/158; H02M 3/1582; H02M 3/1584; H02M 3/1588; G05F 1/56; G05F 1/574; G05F 1/575
USPC ....... 323/222, 224, 225, 235, 271, 272, 274, 323/282–285
See application file for complete search history.

(56) References Cited

U.S. PATENT DOCUMENTS

| | | | |
|---|---|---|---|
| 7,230,408 B1* | 6/2007 | Vinn | H02M 3/156 323/273 |
| 8,432,144 B2* | 4/2013 | Notani | G05F 1/10 323/280 |
| 2015/0137776 A1* | 5/2015 | Thomas | H02M 3/1588 323/271 |

* cited by examiner

Primary Examiner — Yemane Mehari
(74) Attorney, Agent, or Firm — Intrinsic Law Corp.

(57) ABSTRACT

A DC-DC power converter includes a switched inductor power converter and a parallel linear voltage regulator. Two transistors are positioned in the switched inductor power converter to periodically set a bridge voltage thereby producing a square wave with a fixed frequency and variable duty cycle. An inductor and an output capacitor filter the bridge voltage so that only the average value of the bridge voltage is passed to the load. Parasitic impedance due to physical separation of the switched inductor power converter and the load is overcome by providing the parallel linear regulator with its own dedicated channel to the load.

27 Claims, 11 Drawing Sheets

APPARATUS AND METHODS FOR INTEGRATED POWER CONVERTER WITH HIGH BANDWIDTH

RELATED APPLICATIONS

This application is related to and claims priority to U.S. Provisional Application No. 62/032,758, entitled "System and Apparatus for Integrated Power Converter with High Bandwidth," filed on Aug. 4, 2014, which is hereby incorporated herein by reference.

TECHNICAL FIELD

The present application is directed to switched inductor power conversion including systems and methods for controlling the output voltage of a switched inductor DC-DC power converter using a parallel linear voltage regulator.

BACKGROUND

Electronic switched-mode DC to DC converters convert one direct current (DC) voltage level to another, by storing the input energy temporarily and then releasing that energy to the output at a different voltage. The storage may be in either magnetic field storage components (inductors, transformers) and/or electric field storage components (capacitors). This conversion method is more power efficient (often 75% to 98%) than linear voltage regulation (which dissipates unwanted power as heat). Efficiency has increased due to the use of power field effect transistors (FETs), which are able to switch at high frequency more efficiently than power bipolar transistors (BJTs). BJTs incur more switching losses and require a more complicated drive circuit.

A buck converter is a voltage step down and current step up converter. In its simplest form, a buck converter comprises two switches and an inductor in series with a load. It controls the current in the inductor by the two switches (usually a transistor and a diode). Heuristically, the buck converter is best understood in terms of the relation between current and voltage of the inductor. Beginning with the switch open (i.e., in the off position), the current in the circuit is 0. When the switch is first closed, the current will begin to increase, and the inductor will produce an opposing voltage across its terminals in response to the changing current. This voltage drop counteracts the voltage of the source and therefore reduces the net voltage across the load.

Over time, the rate of change of current decreases, and the voltage across the inductor also then decreases, increasing the voltage at the load. During this time, the inductor is storing energy in the form of a magnetic field. If the switch is opened while the current is still changing, then there will always be a voltage drop across the inductor. So, the net voltage at the load will always be less than the input voltage source.

When the switch is opened again, the voltage source will be removed from the circuit, and the current will decrease. The changing current will produce a change in voltage across the inductor, now aiding the source voltage. The stored energy in the inductor's magnetic field supports current flow through the load. During this time, the inductor is discharging its stored energy into the rest of the circuit. If the switch is closed again before the inductor fully discharges, the voltage at the load will always be greater than zero.

Switched inductor, DC-DC down-converters, and buck converters provide conversion of power from one potential to another lower voltage potential. These types of converters are used in a broad and diverse set of applications. One typical application is the conversion and regulation of power supplies for microprocessors and other sensitive or high performance integrated circuits.

Modern integrated circuits using advanced complementary metal oxide semiconductor (CMOS) technology run on power supplies with voltages at 1V or less, while the power levels delivered to a computer are typically at 120V or higher. The power is down-converted in the computer from 120V AC to 1V DC for the microprocessor through a series of power converters. AC-DC converters will generally provide a range of DC voltages such as 3.3V, 5V and 12V, and then a buck converter will take one of those power levels and down-convert to the 1V required by the microprocessor.

Some buck converters down-convert power by driving a low pass filter with a pulse width modulation (PWM) signal. The low pass filter comprises an inductor in series with a capacitor, which is in parallel with the load. PWM signals are rectangular pulse wave trains whose pulse width is modulated resulting in a variation of the average value of the waveform. The PWM signal is produced by power switches or transistors that modulate a DC signal by connecting the input inductor terminal to either the input power supply (DC) or ground.

In the idealized converter, all the components are considered to be perfect. Specifically, the switch and the diode have zero voltage drop when on and zero current flow when off and the inductor has zero series resistance. Further, it is assumed that the input and output voltages do not change over the course of a cycle (this would imply that the output capacitance is infinite).

Typical buck converters have some physical separation from the load that they are powering. The physical separation results in an unwanted parasitic inductance and resistance between the output of the buck converter and the load. In the event of a load current transient, the high frequency content of that transient will see high impedance due to the parasitic inductance, and consequently there will be a large deviation in the voltage of that power supply.

Figure 1:
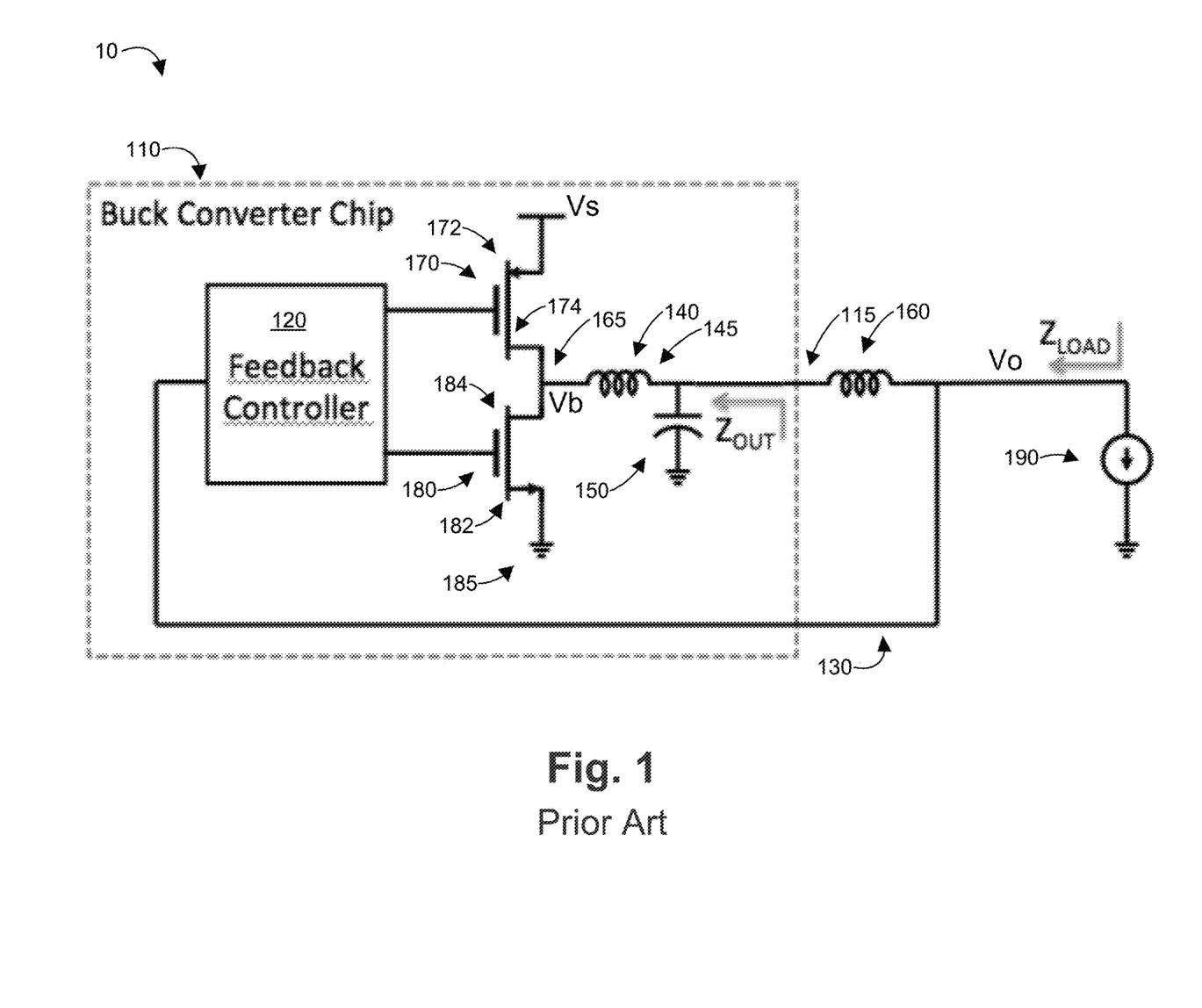
FIG. 1 illustrates a schematic view of an exemplary power converter with voltage sensing feedback loop according to the prior art.

FIG. 1 illustrates a schematic view of an exemplary power conversion system 10 according to the prior art. The system 10 includes a buck converter chip 110 with voltage sensing feedback loop 130. Buck converter chip 110 comprises feedback controller 120, n-type metal oxide semiconductor field effect transistor (NMOS transistor) 180, p-type metal oxide semiconductor field effect transistor (PMOS transistor) 170, series inductor 140, and shunt capacitor 150.

In concert, NMOS 180 and PMOS 170 transistors are comprised by a complementary metal oxide semiconductor (CMOS) device. As is customary in the art, NMOS transistor 180 source 182 is tied to ground 185, and PMOS transistor 170 source 172 is tied to input power ($V_S$). NMOS transistor 180 drain 184 is in electrical communication with PMOS transistor 170 drain 174 and CMOS output 165 (bridge voltage Vb), as illustrated in FIG. 1. PMOS 170 and NMOS 180 transistor gates are electrically controlled by feedback controller 120. In one or more embodiments, PMOS 170 and NMOS 180 transistor gates are tied together in a traditional CMOS device configuration.

By opening and closing PMOS 170 and NMOS 180 transistor gates in a periodic, binary clock cycle, feedback controller 120 generates a pulse width modulation (PWM) signal at the CMOS device output 165. When PMOS transistor 170 is open, NMOS transistor 180 is closed and vice-versa, thereby engendering square wave form at the bridge voltage Vb. Feedback controller 120 modulates the width (on time) of the signal train giving rise to the PWM signal. Width determination (i.e., duty cycle) by feedback controller 120 is discussed in greater detail later in the disclosure.

PWM signal drives current though series inductor 140 at the bridge voltage Vb. The second terminal 145 of series inductor 140 is wired to buck converter chip output voltage and shunt capacitor 150 in parallel. As can be appreciated by one skilled in the art, the present configuration creates a low pass filter at the buck converter chip output voltage assuming a resistive load thereto, at least in part. The fundamental frequency of the PWM signal generated by the PMOS 170 and NMOS 180 transistor gates is configured to be much higher than the LC resonance of the output low pass filter formed by series inductor 140 and shunt capacitor 150. Consequently, the output of the filter is the average value of the switching signal, which is equal to the voltage of the input power supply Vs multiplied by the duty cycle of the PWM signal.

Power conversion system 100 incorporates feedback control through voltage sensing loop 130 of the buck converter chip 110. Measured at load 190, feedback control keeps a constant output voltage Vo (or approximately constant output voltage Vo such as within 5% or 10% or 15%) at load 190 with changing operating conditions such as input voltage ($V_s$) or load 190 current. At frequencies above the LC resonance, shunt capacitor 150 provides a low output impedance ($Z_{out}$) which maintains the output voltage Vo during load 190 current transients. At frequencies below the LC resonance, the feedback controller 120 will modulate the buck converter's duty cycle to keep the output voltage Vo static during load 190 current transients.

Ideally, these components are lossless, which would result in near 100% conversion efficiency for the buck converter chip 110. In reality, series resistance in the series inductor 140, shunt capacitor 150 and switches (NMOS 170, PMOS 180 transistors) all result in loss. Similarly, parasitic capacitance in the series inductor 140 and capacitive switching losses from the switches (NMOS 170, PMOS 180 transistor gates) also result in inefficiency. Moreover, parasitic inductance 160 occurs along the wiring or power delivery channel (e.g., circuit trace elements) from the buck converter chip 110 output 115 to the load 190 which also detrimentally affects the desired functionality of the power conversion system 10. Accordingly, there is need in the art to provide for an efficient, regulated power supply which ameliorates the effects of parasitic inductance 160 et al.

Figure 2:
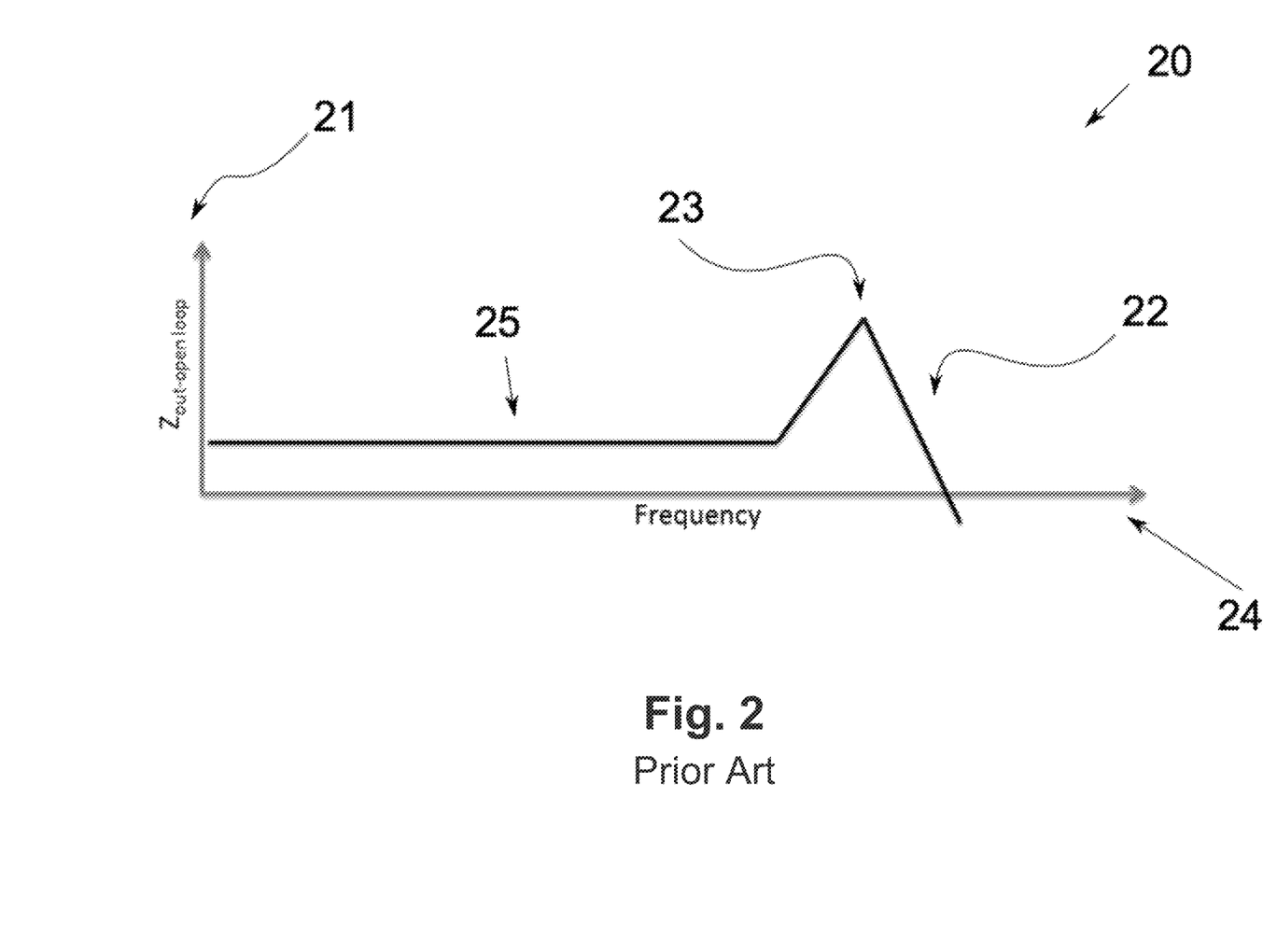
FIG. 2 is a graphical plot representing an open loop frequency response of the exemplary power converter according to the prior art.

FIG. 2 is a graphical plot representing a frequency response 20 of an exemplary buck converter without feedback control according to the prior art. Open loop output impedance ($Z_{out-open}$) 21 is graphed as a function of frequency ω 24. The frequency response 20 of the buck converter indicates how the output voltage will change in response to changes in load current at a particular load frequency. (Those in the art may recognize the similarity to the transfer function plot, $|H(j\omega)|$.)

Ideally, the output impedance $Z_{out-open}$ is flat and very low, thereby maximizing the power transfer to the load in linear manner with respect to frequency. Frequency response 20 is an approximate, graphical representation of a buck converter without parasitic inductance between the buck converter and load. The output impedance $Z_{out-open}$ here is set by the buck converter inductor and capacitor and inductor series resistance. With reference to FIG. 2, peak 23 is located at resonant frequency $\omega_r=1/\sqrt{(LC)}$. Low pass response 25 rises to meet peak 23. It can be observed that peak 23 drops off dramatically at the slope of the higher frequency response 22.

Figure 3:
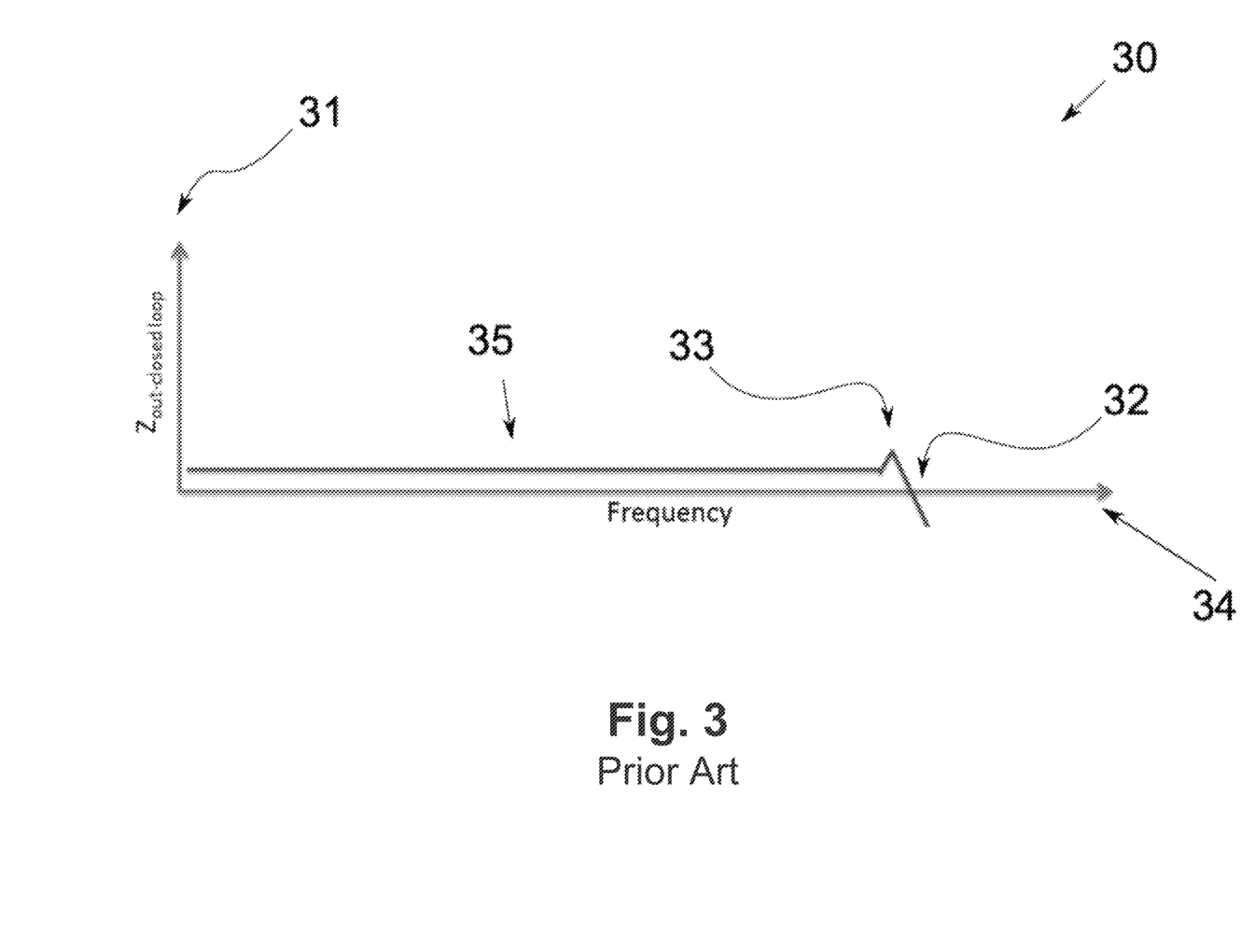
FIG. 3 is a graphical plot representing a closed loop frequency response of the exemplary power converter according to the prior art.

FIG. 3 is a graphical plot representing a frequency response 30 of an exemplary buck converter with some feedback control according to the prior art. Closed loop output impedance ($Z_{out-closed}$) 31 is graphed as a function of frequency ω 34. With the feedback controller for the buck converter in operation, higher impedance at peak 33 (contrast to peak 23 of FIG. 2) is counteracted by feedback controller to provide a more desirable output impedance $Z_{out-closed}$. Low pass response 35 remains flat as a function of frequency ω 34; however, the area integrated under peak 33 is smaller.

Figure 4:
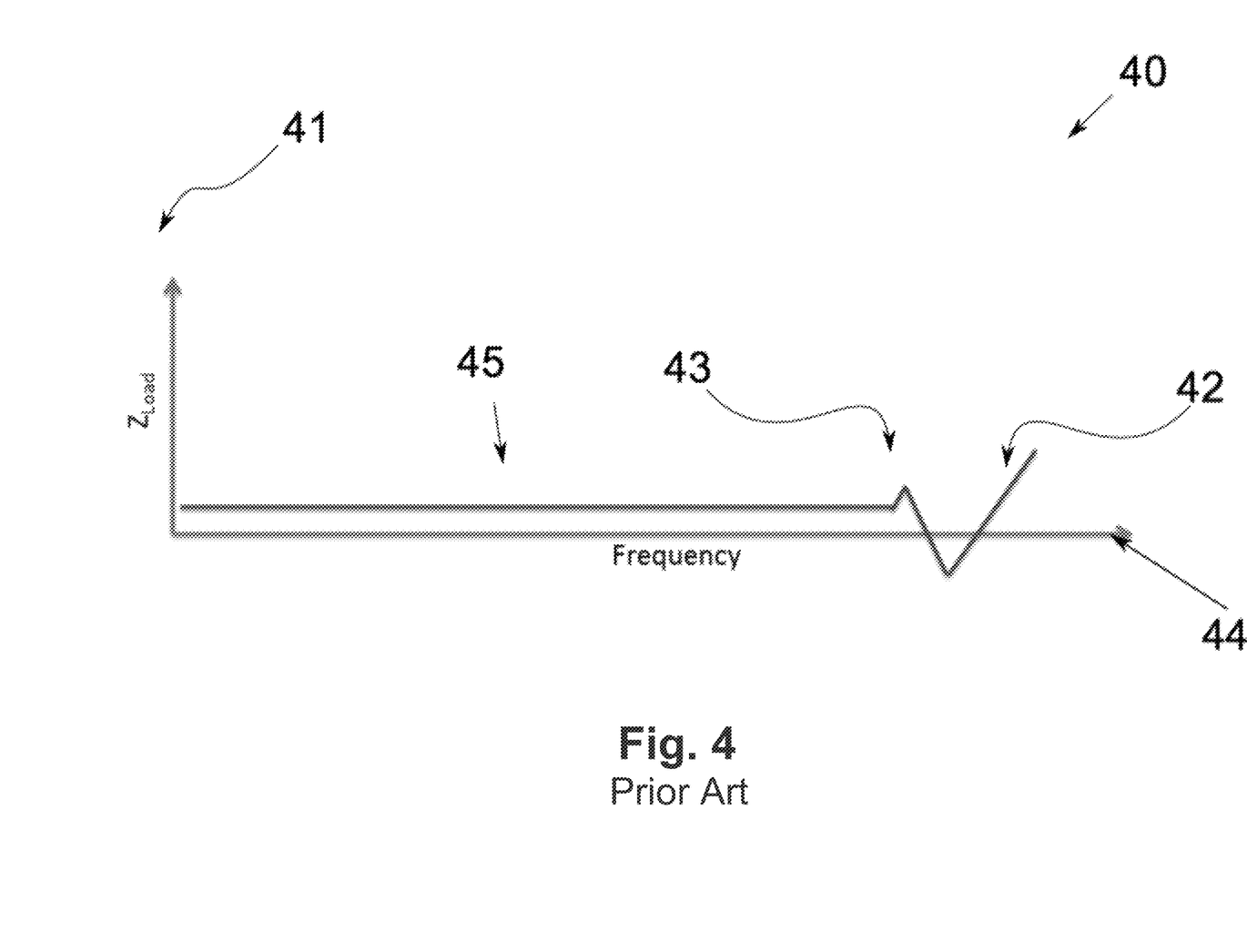
FIG. 4 graphically plots the device output impedance with parasitic inductance at load according to the prior art.

FIG. 4 is a graphical plot representing a frequency response 40 of an exemplary buck converter with some feedback control and parasitic inductance according to the prior art. Load impedance ($Z_{load}$) 41 is graphed as a function of frequency ω 44. Up until peak 43, low pass response 45 is similar to that shown in FIG. 3, with the feedback controller for the buck converter in operation by counteracting the higher impedance. Peak 43 corresponds to the LC resonance frequency discussed above.

Turning to FIG. 4, the impedance at the load $Z_{load}$ is shown with the parasitic inductance between the buck converter chip output and the load. As a result, parasitic inductance causes the output impedance $Z_{load}$ to increase at higher frequencies (see high frequency response 42), despite the low output impedance provided by the output capacitor in the buck converter.

With the development of highly integrated electronic systems that consume large amounts of electricity in very small areas, the need arises for new technologies that enable improved energy efficiency and power management for future integrated systems. Integrated power conversion is a promising potential solution as power can be delivered to integrated circuits at higher voltage levels and lower current levels. That is, integrated power conversion allows for step down voltage transformers to be disposed in close proximity to transistor elements.

Accordingly, there is a need for high quality inductors to be used in large scale CMOS integration. This provides a platform for the advancement of systems comprising highly granular dynamic voltage and frequency scaling as well as augmented energy efficiency. The present disclosure contemplates the novel fabrication of efficient and compact on-chip, high bandwidth power converters and practical methods for manufacturing operating thereof for remedying these and/or other associated problems.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

As mentioned above, the present invention relates to new and improved systems and apparatus for providing integrated, high bandwidth power converters. In particular, the present application relates to systems for controlling the output voltage of a switched inductor DC-DC power converter using a parallel linear voltage regulator, where the power converter and linear regulator are primarily residing on a single integrated circuit substrate.

This invention serves to regulate the power supply by reducing the effect of parasitic inductance between a power converter and a load by using a parallel linear regulator and a power converter feedback loop. The linear regulator may be on the same integrated circuit (IC) as the power converter (e.g., buck converter), but the output of the linear regulator is preferably not connected to the output of the power converter on that chip. Rather the linear regulator should have its own, independent electrical coupling to the load, so that the parasitic inductance in that interconnect provides some electrical isolation between the linear regulator output and the output capacitor of the buck converter.

This allows the linear regulator to rapidly swing the potential of its output, and consequently generate a large change in current through the parasitic inductance between the linear regulator and the load. The large change in current will reduce the voltage drop in the power supply at the load that would otherwise be caused by a large change in the load current. This circuit technique provides a smaller output impedance at significantly higher frequencies than what is achieved with the buck converter alone.

The control circuit of the linear regulator comprises common/open drain field effect transistors biased in the subthreshold region. The transistors conduct only a negligible amount of current unless the voltage sense terminal moves. If the voltage sense terminal changes, some portion of that change in voltage will be coupled onto the gate nodes of the transistors.

This will subsequently conduct current in a manner to counteract the change in voltage at the load. The circuit provides high frequency regulation to augment that of the buck converter without conducting quiescent current through the transistors. Thus, the present invention provides a more efficient power converter than a linear controller (non-LDO) alone.

In an aspect, the invention includes an apparatus comprising a switched inductor power converter, a low-pass filter, a voltage sense path, and a parallel linear regulator. The low-pass filter has an input in electrical communication with an output of the power converter and an output in electrical communication with a power delivery channel, the power delivery channel for providing an output power to a load. The voltage sense path is in electrical communication with the power delivery channel and the power converter. The parallel linear regulator is in parallel electrically with the voltage sense path.

In an aspect, the invention includes a method of controlling power for a load. The method includes, in a switched inductor power converter, reducing a voltage of an input power supply to a reduced voltage suitable for the load. The method also includes delivering an output power to the load through a power delivery channel. The method also includes, in a voltage sense path in electrical communication with the power delivery channel and the power converter, sensing an output voltage of the output power at a node proximal to the load. The method also includes, in a parallel linear regulator in parallel electrically with the voltage sense path, providing a regulator current to the load during an output voltage error when the output voltage to the load is different than a target voltage for the load.

IN THE DRAWINGS

For a fuller understanding of the nature and advantages of the present invention, reference is be made to the following detailed description of preferred embodiments and in connection with the accompanying drawings, in which.

DETAILED DESCRIPTION

As mentioned above, the present invention relates to switched inductive converters that control the output voltage using a parallel linear voltage regulator and a feedback loop. One or more embodiments or implementations are hereinafter described in conjunction with the drawings, where like reference numerals are used to refer to like elements throughout, and where the various features are not necessarily drawn to scale.

The present application discloses a novel DC-DC power converter that can be integrated onto the same chip as a linear voltage regulator, according to some embodiments. The system regulates the power supply, despite the parasitic inductance formed between the power converter and the load, using a parallel linear regulator and power delivery channel. As stated, the linear regulator may be on the same integrated circuit (IC) as the buck converter, but the output of the linear regulator is preferably not connected to the output of the buck converter on the buck converter chip.

Figure 5:
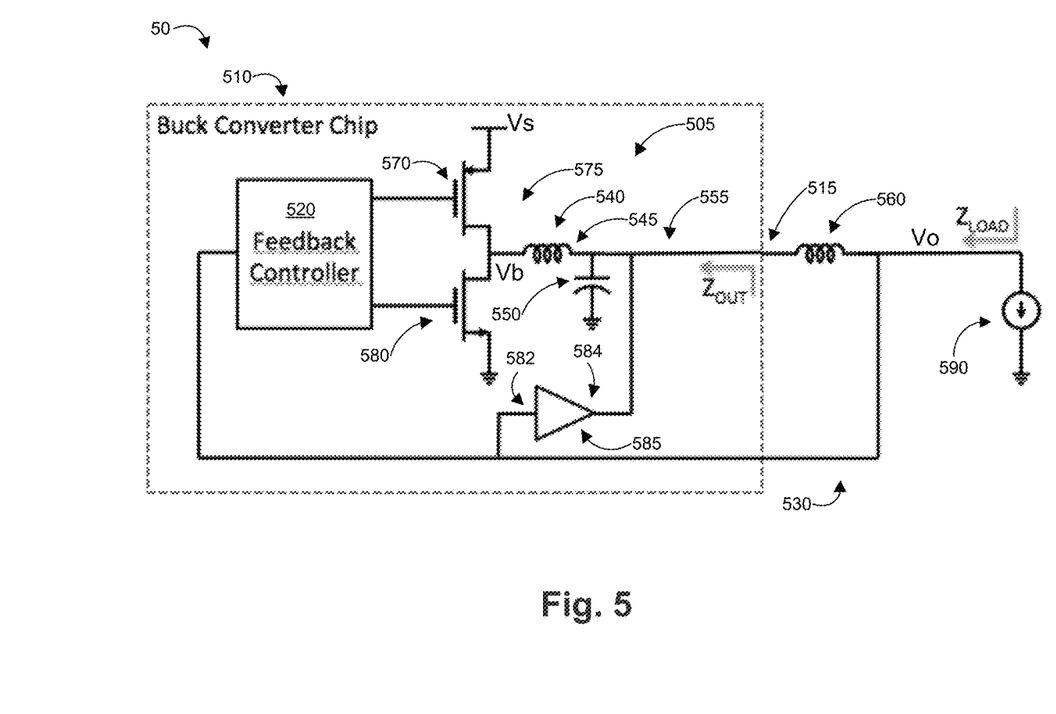
FIG. 5 illustrates a schematic view of an exemplary power converter with voltage sensing feedback loop and linear control element.

FIG. 5 illustrates a schematic view of an exemplary power conversion system 50 with voltage sensing feedback loop 530 and linear control element 585, according to an embodiment. Buck converter chip 510 comprises feedback controller 520, CMOS PWM signal generator 575 (comprised of a CMOS device), series inductor 540, shunt capacitor 550, feedback loop 530 and linear control element 585. As discussed above, series inductor 540 and shunt capacitor 550 form a low pass filter 555 assuming a resistive load thereto. A switched inductor power converter 505 is formed by the feedback controller 520, CMOS PWM signal generator 575, and the low pass filter (series inductor 540 and shunt capacitor 550).

CMOS PWM signal generator 575 comprises PMOS 570 and NMOS 580 transistors to produce a periodic rectangular wave with a predetermined frequency as previously described. Feedback controller 520 compensates for high current loads 590 and variations in input power (Vs) by monitoring output voltage (Vo) proximal to the load 590 via voltage sensing loop 530. The feedback controller 520 calculates a voltage error, which is the difference between the actual output voltage Vo and a target output voltage. The target output voltage can be set manually or pre-programmed based on the specifications of the load 590. If there is a positive voltage error (i.e., the actual output voltage Vo is greater than the target output voltage), the feedback controller 520 responds by decreasing the duty cycle of the PWM signal generated by CMOS PWM signal generator 575. If there is a negative voltage error (i.e., the actual output voltage Vo is less than the target output voltage), the feedback controller 520 responds by increasing the duty cycle of the PWM signal generated by CMOS PWM signal generator 575. The switched inductor power converter 505 is configured to respond to low frequency variations in voltage error (e.g., less than the LC resonance frequency of the output low pass filter). Frequencies higher than the LC resonance frequency cannot pass through the series inductor 540.

Thus, the feedback controller 520 modulates the duty cycle of the PWM signal to create a constant (or substantially constant) actual output voltage Vo. In some embodiments, the feedback controller 520 modulates the duty cycle of the PWM signal using a PID (proportional-integral-differential), PI, or PD controller. The output of the low pass filter also remains relatively constant which is the average value of the switching signal which is equal to the voltage of the input power supply (Vs) multiplied by the duty cycle of the PWM signal.

PWM signal drives current though series inductor 540 at the bridge voltage (Vb). The second terminal 545 of series inductor 540 is wired to output power to delivery line 555 and shunt capacitor 550 in parallel. The fundamental frequency of the PWM signal is configured to be higher than the LC resonance of the output low pass filter, which is determined by series inductor 540 and shunt capacitor 550.

Series resistance in the series inductor 540, shunt capacitor 550 and switches 570, 580 of the CMOS PWM signal generator 575 all result in loss. Similarly, a parasitic inductance 560 occurs along the delivery line 555 (e.g., circuit trace elements) from the buck converter chip 510 output 515 to the load 590 which also detrimentally affects the functionality of the power conversion system 50.

The efficacy of load regulation by the feedback controller 520 is diminished due to the parasitic capacitances, parasitic inductance 560 and inherent resistivity in the circuit elements. In one configuration, a separate linear control element 585 is added to the buck converter chip 510. The input 582 of the linear control element 585 monitors the output voltage Vo from the feedback loop/voltage sensing path 530. The output 584 of the linear control element 585 contributes to the regulation of the output voltage Vo by responding to high frequency variations (e.g., greater than the LC resonance frequency of the output low pass filter) in the output voltage Vo as discussed below.

In some embodiments, linear control element 585 is a low-dropout (LDO) regulator. Yet, any suitable DC voltage regulator is not beyond the scope of the present invention. A low-dropout or LDO regulator is a DC linear voltage regulator that can operate with a very small input-output differential voltage. In the present configuration illustrated in FIG. 5, the effectiveness of the linear control element 585 is somewhat limited because the linear controller element 585 is still filtered by the shunt capacitor 550 and parasitic inductance 560.

Figure 6:
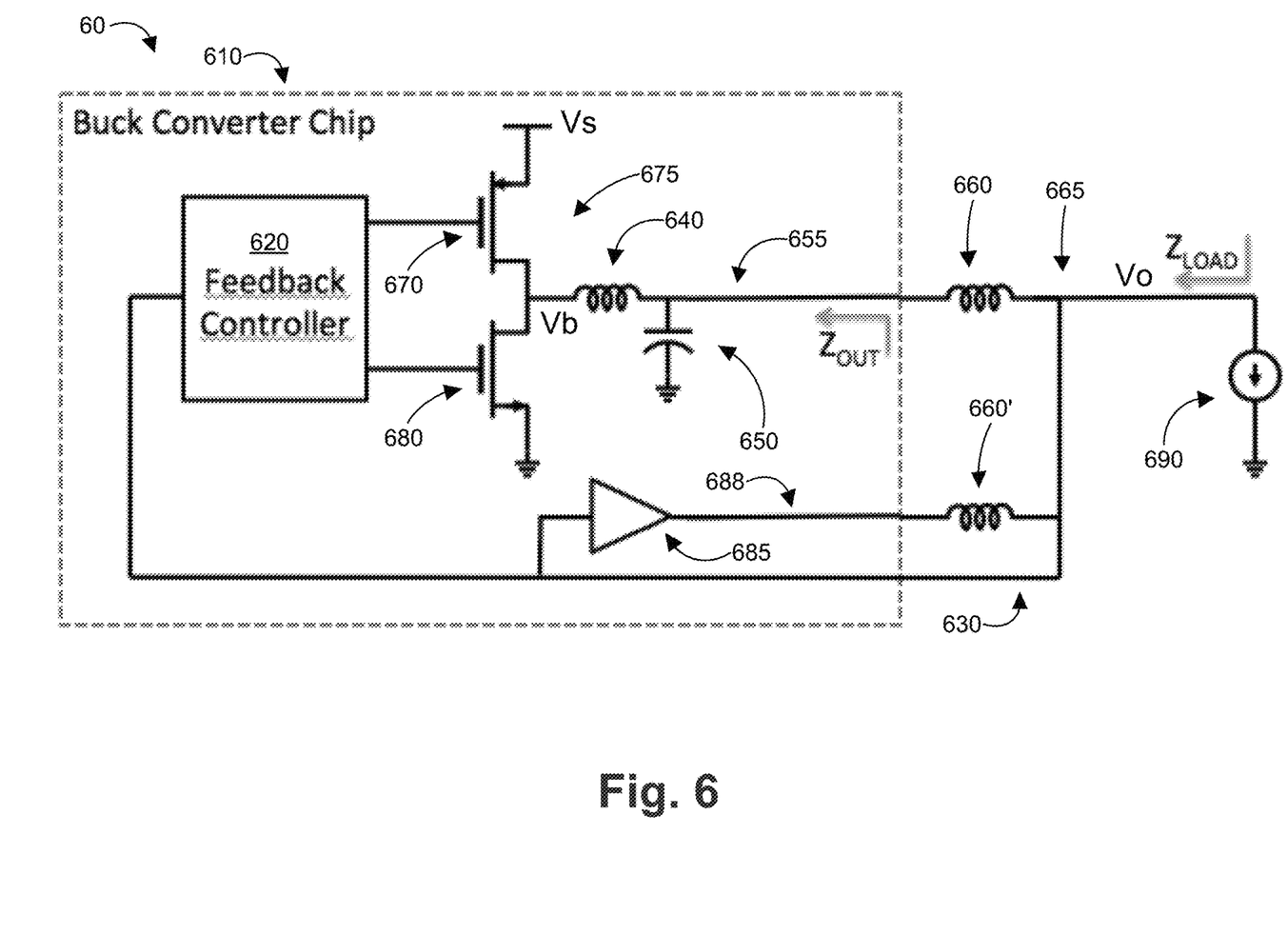
FIG. 6 illustrates an schematic view of an exemplary power converter with voltage sensing feedback loop and linear control element according to an embodiment.

FIG. 6 illustrates a schematic view of an exemplary power converter 60 with voltage sensing feedback loop 630 and linear control element 685 according to an embodiment. As with the previous configuration, buck converter chip 610 comprises feedback controller 620, CMOS PWM signal generator 675, series inductor 640, shunt capacitor 650, feedback loop 630 and linear control element 685. As discussed above, CMOS PWM signal generator 675 comprises PMOS 670 and NMOS 680 transistors to produce a periodic rectangular wave with a predetermined frequency. The duty cycle of the rectangular wave can be modulated to provide a constant output voltage Vo at the load 690.

The efficacy of output voltage Vo regulation is augmented by the configuration of the linear control element 685 relative to the load 690. Feedback power of the linear control element 685 is delivered by its own parallel channel 688 to the load 690. There is an additional parasitic inductance 660' (in addition to parasitic inductance 660) associated with the new electrical connection. However, the present embodiment provides isolation between the linear control element 685 and the shunt capacitor 650 (via parallel channel 688) which enables the linear control element 685 to be much more effective at reducing the effect of the parasitic inductance 660 on the output impedance at the load 690. The isolation is enhanced by disposing the connection 665 of the parallel channel 688 and the power delivery channel 655 to be off the buck converter chip 610.

In one or more embodiments, linear control element 685 employs PID (proportional-integral-differential), PI, or PD compensation with a cut-off frequency (e.g., unity gain bandwidth) slightly above the LC resonance frequency. The advantages of a LDO regulator include a lower minimum operating voltage, higher efficiency operation and lower heat dissipation. The combination of the feedback controller and output capacitor provide a broadband low output impedance of the buck converter.

The linear control element 685 can be configured to regulate the output voltage Vo when the output voltage error is greater than a minimum value (e.g., 5 mV). For example, when the output voltage error is less than 5% or less than 1% of the output voltage Vo, the linear control element 685 will not be activated and, thus, the linear control element 685 will not regulate the output voltage Vo. However, when the output voltage error is greater than 5% or greater than 10% of the output voltage Vo, the linear control element 685 will be activated and, thus, the linear control element 685 will regulate the output voltage Vo as described above.

Figure 7:
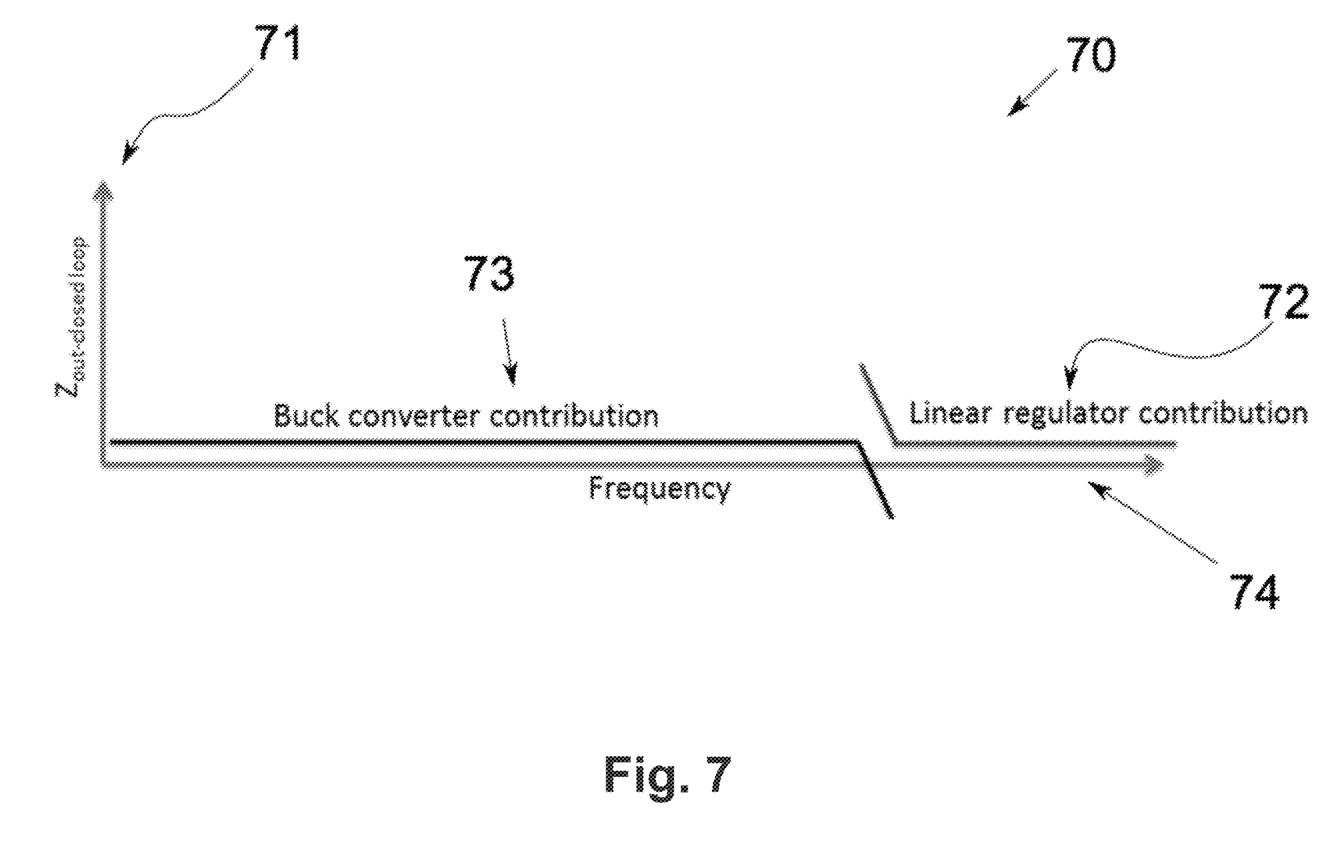
FIG. 7 is a graphical juxtaposition of the impedance contributions of an exemplary power converter and linear control element in frequency space.

FIG. 7 is a graphical juxtaposition of the impedance contributions 70 of an exemplary power converter and linear control element in frequency space. Load impedance ($Z_{closed}$) 71 is graphed as a function of frequency ω 74. Buck converter contribution 73 is similar to the low pass response of FIG. 3. Linear control element contribution 72 mitigates parasitic inductances between the buck converter chip and the load.

Figure 8:
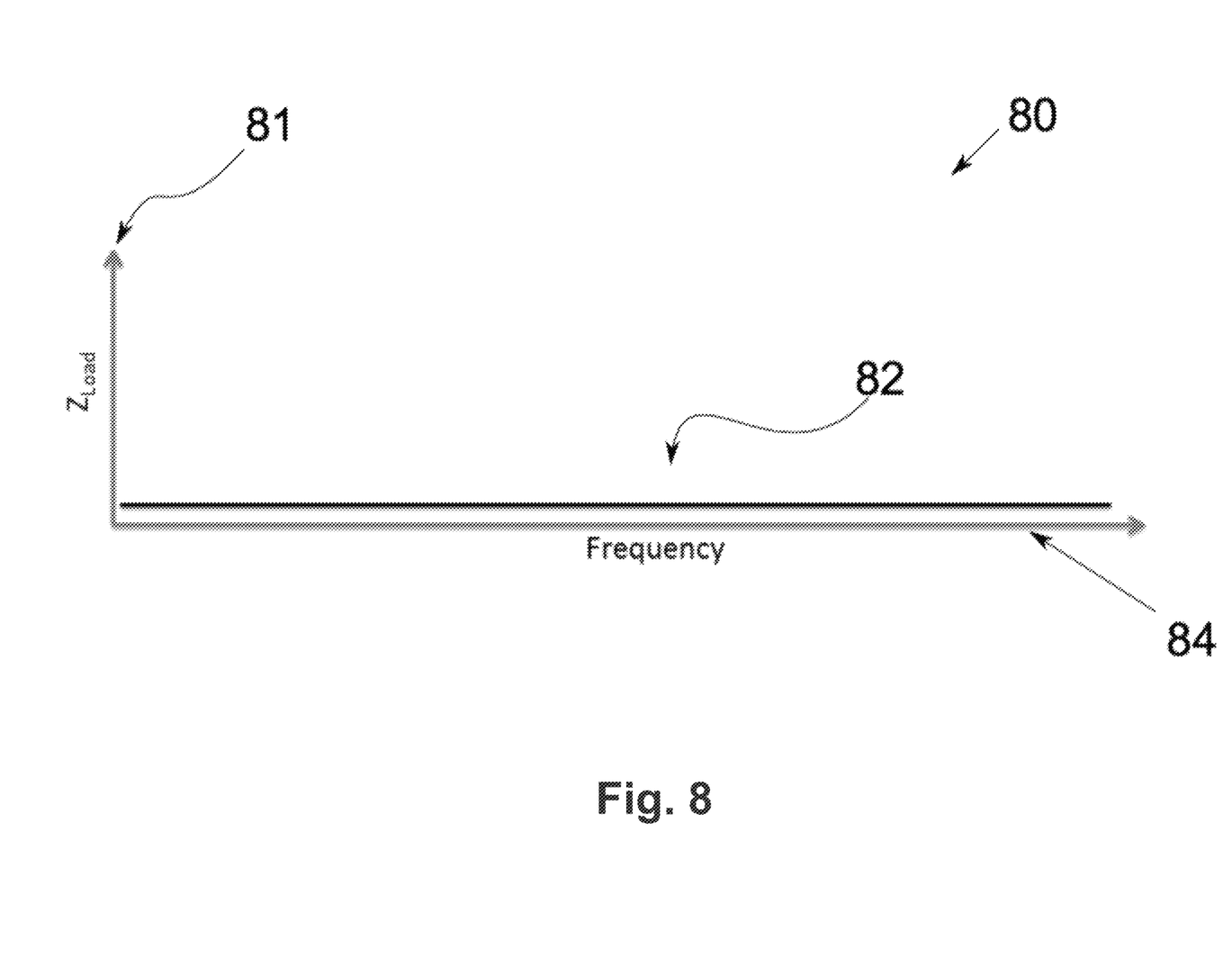
FIG. 8 is a graphical superposition of an exemplary power converter and linear control element in frequency space.

FIG. 8 is a graphical superposition 80 of an exemplary power converter and linear control element in frequency space. Load impedance ($Z_{load}$) 81 is graphed as a function of frequency ω 84. Buck converter and linear control element contributions are superposed to produce an ideal or substantially ideal (e.g., within 5%, 10%, or 15%) frequency response curve 82. With the combination of the buck converter and linear regulator, the desirable flat output impedance can be achieved at the load, despite the parasitic inductance between the buck converter chip and load.

Figure 9:
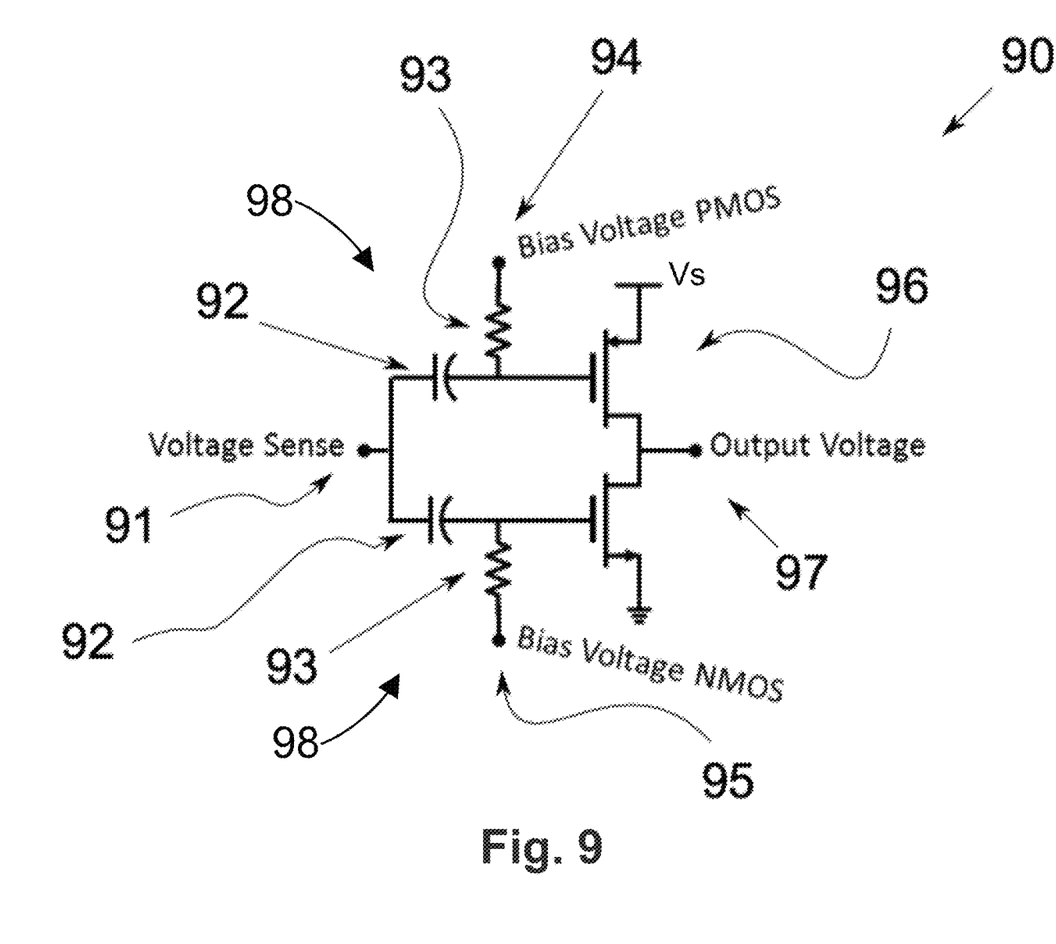
FIG. 9 illustrates an schematic view of an exemplary linear control circuit according to an embodiment.

FIG. 9 illustrates a schematic view of an exemplary linear control circuit 90 according to an embodiment. Linear control circuit 90 comprises voltage sense node 91, buffer capacitors 92, bias resistors 93, CMOS amplifier 96 and output node 97. The linear control circuit 90 can comprise the linear control element 585 and/or 685 described above. In one or more embodiments, linear control circuit 90 turns on in the event of load current transients (e.g., deviations from a desired current) or output voltage errors (e.g., deviations from a desired output voltage). Linear control circuit 90 can be designed to have some dead band, or range of voltage deviations that do not result in any change in the output current. Linear control circuit 90 can rapidly respond to load current transients by having a very short and fast signal path. Thus, linear control circuit 90 can rapidly respond to high-frequency variations in the load current or output voltage.

This is achieved with parallel PMOS and NMOS common source amplifiers (comprised by CMOS amplifier 96) whose sources are connected to the input power supply (Vs) and the output 97 respectively. Their drains are electrically coupled to the output 97 and ground respectively. Their gates are biased by appropriate PMOS, NMOS bias voltages 94, 95 (via large resistors 93) in the subthreshold region of operation which can provide a dead band response behavior in some embodiments. In some embodiments, linear control circuit 90 comprises BJT emitter followers or other suitable amplification. The resistors 93 can be selected so that the RC time constant of high pass filter 98, formed by buffer capacitors 92 and resistors 93, is approximately equal to the LC resonant frequency of the low pass filter in the power conversion system (e.g., power conversion system 50).

CMOS amplifier 96 gates are also electrically coupled to voltage sense node 91 through buffer capacitors 92. The voltage sense node 91 is electrically coupled to the voltage sense feedback loop (e.g., feedback loop 630). Thus, the voltage sense node 91 receives the output voltage Vo, sensed by the voltage sense feedback loop, as an input. The output voltage 97 is electrically coupled to the power delivery channel as discussed above.

By biasing the CMOS amplifier 96 in the subthreshold region, the transistors (PMOS and NMOS) conduct only a negligible amount of current unless the voltage applied to the voltage sense node 91 changes. If the output voltage Vo changes (and there is a voltage error), some portion of that change in voltage will be coupled onto CMOS amplifier 96 gates (via voltage sense node 91 and buffer capacitors 93), which will subsequently conduct current in a manner to counteract the change in output voltage Vo. The high pass filter 98 can decouple the voltage level on the voltage sense node 91 from the amplifier 96 gates. The supplemental current is conducted through output 97 to the load. If the output voltage Vo changes at a low frequency (e.g., 10× lower than the inverse of the RC time constant for high-pass filter 98), the change will not be communicated through buffer capacitors 92. Thus, the linear control circuit 90 provides high frequency regulation to augment that of the buck converter, without conducting any (or only a negligible) steady state current, which would be more efficient for the power converter than using the linear controller alone.

In the event of a load current transient, the output power supply voltage Vo will change, resulting in a voltage error. This change will be communicated to the linear control circuit 90 by the voltage sense path (e.g., voltage sensing feedback loop 630). The change in output voltage will be directly coupled (through buffer capacitors 92) onto the gates of the common source amplifiers 96 (e.g., CMOS PWM signal generator 675) and cause one of the two devices (e.g., PMOS 670 and NMOS 680 transistors) to conduct current to the load (e.g., load 690). Since the bias voltage generated by resistors 93 is slightly less than the threshold voltage for the amplifier 96, the change in output voltage can increase the bias voltage to be greater than or equal to the threshold voltage. The gain of these amplifiers 96 can be designed so that enough additional current is sourced from linear control circuit 90 to reduce the total variation in the output voltage Vo, consequently lowering and/or maintaining the effective impedance of the power supply at the load. The gain of the amplifiers 96 can be set, at least in part, by the bias voltage generated by resistors 93.

Figure 10:
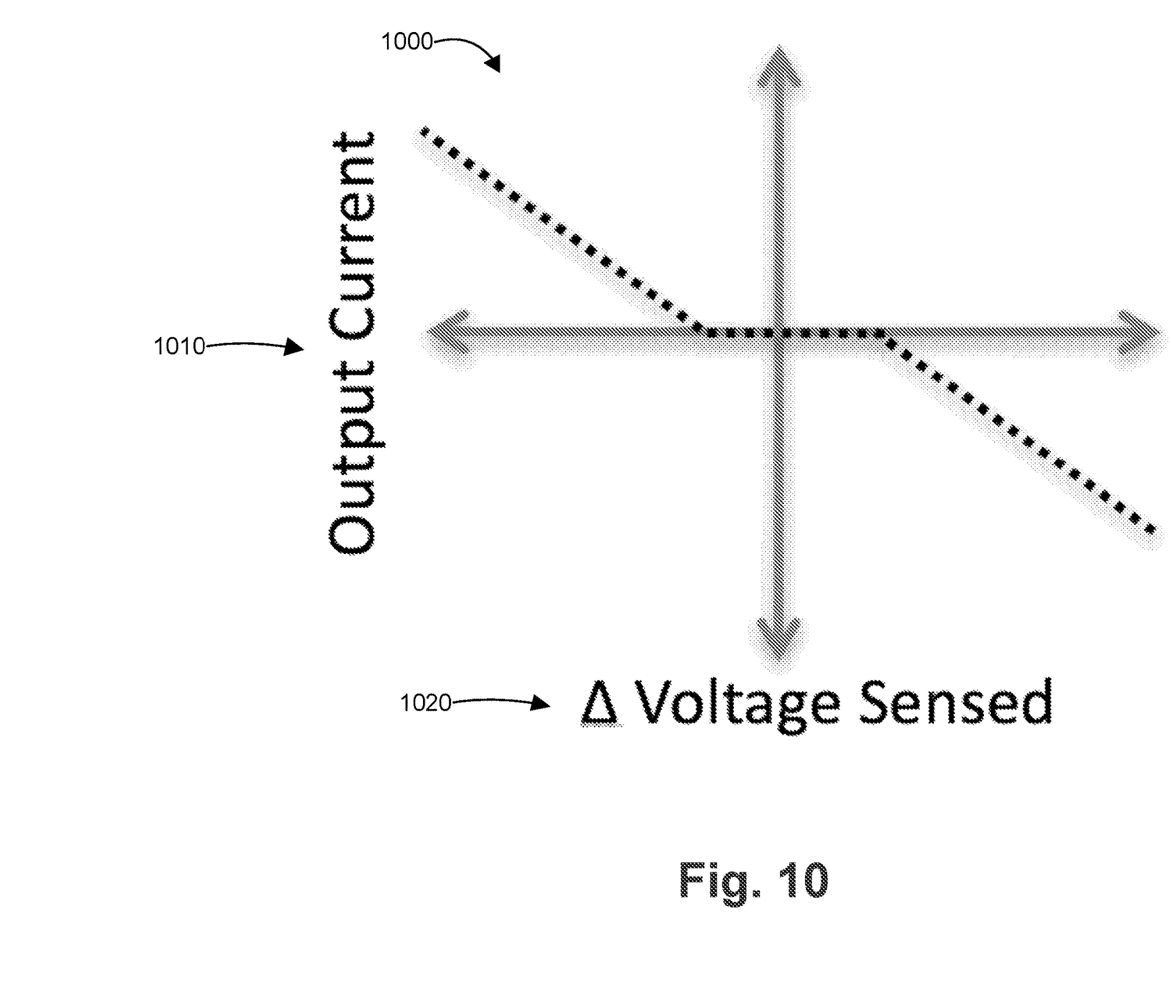
FIG. 10 is a graphical depiction of the exemplary linear control circuit's output current as a function of delta voltage sensed.
Figure 11:
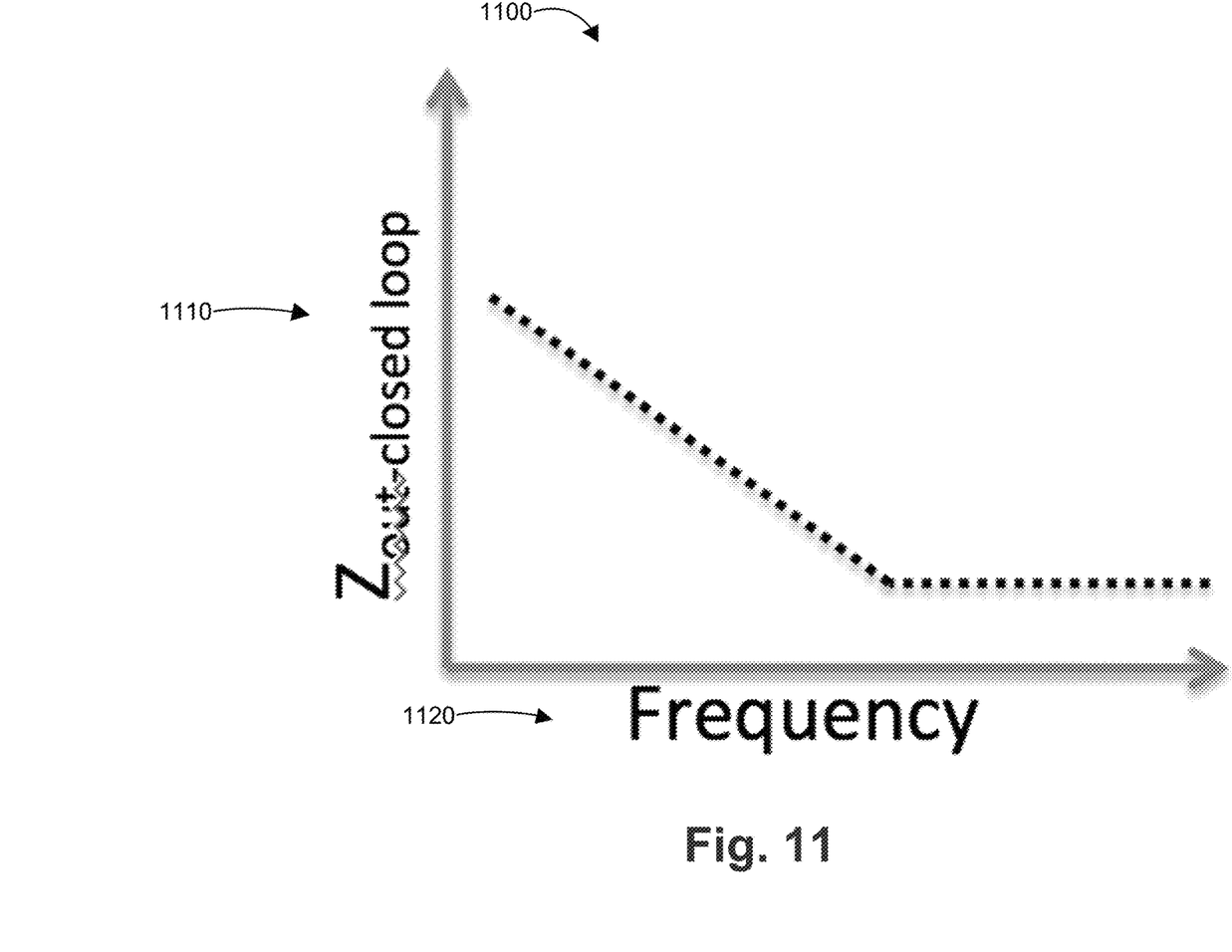
FIG. 11 is a graphical plot representing the frequency response of the exemplary linear control circuit.

FIG. 10 is a graphical depiction of a dead band response 1000 of an exemplary low-dropout (LDO) regulator. As demonstrated, LDO regulator output current 1010 is plotted as a function of delta voltage sensed 1020 between input voltage sense node and gate bias voltages. FIG. 11 is a graphical plot 1100 representing the frequency response of the exemplary LDO regulator. Load impedance ($Z_{closed}$) 1110 is graphed as a function of frequency ω 1120.

This present invention is designed to be easily integrated with complementary metal oxide semiconductor (CMOS) and integrated circuit chip fabrication. In some embodiments, the linear control circuit with a parallel load channel can be integrated with a buck converter on a single chip or die. However, other scale and methods of manufacture are not beyond the scope of the present invention.

The embodiments described and illustrated herein are not meant by way of limitation, and are rather exemplary of the kinds of features and techniques that those skilled in the art might benefit from in implementing a wide variety of useful products and processes. For example, in addition to the applications described in the embodiments below, those skilled in the art would appreciate that the present disclosure can be applied to other applications.

The present invention should not be considered limited to the particular embodiments described above, but rather should be understood to cover all aspects of the invention as fairly set out herein. Various modifications, equivalent processes, as well as numerous structures to which the present invention may be applicable, will be readily apparent to those skilled in the art to which the present invention is directed upon review of the present disclosure.

What is claimed is:

1. An apparatus comprising:
   a switched inductor power converter having a CMOS device and a low-pass filter, the low-pass filter having an input in electrical communication with an output of the CMOS device and an output in electrical communication with a power delivery channel, the power delivery channel for providing an output power to a load;
   a voltage sense path in electrical communication with the power delivery channel and the power converter; and
   a parallel linear voltage regulator in parallel electrically with the voltage sense path, wherein:
      the parallel linear voltage regulator and the power converter are disposed on a common substrate, and
      the parallel linear voltage regulator and the power converter have independent electrical interconnects that are electrically coupled at a connection proximal to the load at a location off of said common substrate.

2. The apparatus of claim 1, wherein the linear voltage regulator is configured to provide a regulator current to the load in response to an output voltage error when an output voltage to the load is different than a target voltage for the load.

3. The apparatus of claim 2, wherein the linear voltage regulator is configured to provide the regulator current only when the output voltage error is greater than a minimum value.

4. The apparatus of claim 1, wherein the low-pass filter and the CMOS device are disposed on said common substrate.

5. The apparatus of claim 4, wherein the low-pass filter comprises an inductor.

6. The apparatus of claim 4, wherein the low-pass filter comprises a capacitor.

7. The apparatus of claim 1, wherein the power converter further comprises a feedback controller, wherein an input of the feedback controller is in electrical communication with the voltage sense path and an output of the feedback controller is in electrical communication with the power converter.

8. The apparatus of claim 7, wherein the feedback controller is configured so that the power converter responds to low frequency variations in the output voltage to the load, the low frequency variations lower than an LC resonance frequency of the low-pass filter.

9. The apparatus of claim 8, wherein the linear voltage regulator is configured to respond to high frequency variations in the output voltage to the load, the high frequency variations greater than an LC resonance frequency of the low-pass filter.

10. The apparatus of claim 8, wherein the power converter and the linear voltage regulator respond together to only a 10 MHz frequency band in variations in the output voltage to the load.

11. The apparatus of claim 1, wherein the linear voltage regulator includes a CMOS amplifier.

12. The apparatus of claim 11, wherein the CMOS amplifier includes a transistor having a source and a drain, wherein the source is electrically coupled to a DC power supply and the drain is electrically coupled to the power delivery channel.

13. The apparatus of claim 12, wherein the linear voltage regulator further comprises a bias resistor electrically coupled to the transistor.

14. The apparatus of claim 13, wherein the transistor is biased in a subthreshold region.

15. The apparatus of claim 12, further comprising a capacitor in series with the transistor and an input of the linear voltage regulator, the input electrically coupled to the voltage sense path.

16. The apparatus of claim 11, wherein the CMOS amplifier includes a NMOS transistor and a PMOS transistor in parallel electrically with one another.

17. The apparatus of claim 1, wherein the load includes a current source.

18. The apparatus of claim 1, wherein the CMOS device includes a PMOS transistor and a NMOS transistor, wherein the PMOS transistor has a PMOS source in electrical communication with a DC power supply and a PMOS drain in electrical communication with an input of the low-pass filter, and the NMOS transistor has a NMOS source in electrical communication with the input of the low-pass filter and the PMOS drain and a NMOS drain in electrical communication with a ground.

19. The apparatus of claim 1, further comprising a parasitic inductor electrically coupled to said electrical interconnect for said parallel linear voltage regulator, said parasitic inductor disposed between said parallel linear voltage regulator and said connection.

20. The apparatus of claim 19, wherein said parasitic inductor provides at least some electrical isolation between an output of said parallel linear voltage regulator and a capacitor in said low-pass filter.

21. A method of controlling power for a load, the method comprising:
in a switched inductor power converter, reducing a voltage of an input power supply to a reduced voltage suitable for the load;
delivering an output power to the load through a power delivery channel;
in a voltage sense path in electrical communication with the power delivery channel and the power converter, sensing an output voltage of the output power at a node proximal to the load;
in a parallel linear voltage regulator in parallel electrically with the voltage sense path, providing a regulator current to the load during an output voltage error when the output voltage to the load is different than a target voltage for the load, wherein
the parallel linear voltage regulator and the power converter are disposed on a common substrate, and
the parallel linear voltage regulator and the power converter have independent electrical interconnects that are electrically coupled at a connection proximal to the load at a location off of said common substrate.

22. The method of claim 21, wherein reducing the voltage of the input power supply further comprises controlling a PMOS transistor gate and a NMOS transistor gate to provide a pulse-width modulated signal.

23. The method of claim 22, further comprising filtering the pulse-width modulated signal in a low-pass filter.

24. The method of claim 23, wherein the parallel linear voltage regulator is configured to provide the regulator current to the load only when a frequency of the output voltage error is less than a LC resonance frequency of the low-pass filter.

25. The method of claim 22, further comprising adjusting the pulse-width modulated signal based on the sensed output voltage.

26. The method of claim 25, wherein the pulse-width modulated signal is adjusted only when a frequency of the output voltage error is greater than a LC resonance frequency of a low-pass filter.

27. The method of claim 21, further comprising biasing a transistor of the linear voltage regulator in a subthreshold region.

* * * * *